US008805075B2

(12) United States Patent
Goodman et al.

(10) Patent No.: US 8,805,075 B2
(45) Date of Patent: Aug. 12, 2014

(54) METHOD AND APPARATUS FOR IDENTIFYING A VIBROMETRY SPECTRUM IN IMAGING APPLICATIONS

(75) Inventors: Vernon R. Goodman, Rockwall, TX (US); Rebekah R. Montgomery, Dallas, TX (US); Steven B. Seida, Wylie, TX (US)

(73) Assignee: Raytheon Company, Waltham, MA (US)

( * ) Notice: Subject to any disclaimer, the term of this patent is extended or adjusted under 35 U.S.C. 154(b) by 141 days.

(21) Appl. No.: 13/610,545

(22) Filed: Sep. 11, 2012

(65) Prior Publication Data

US 2014/0072220 A1    Mar. 13, 2014

(51) Int. Cl.
*G06K 9/34* (2006.01)

(52) U.S. Cl.
USPC .......................................... 382/173

(58) Field of Classification Search
None
See application file for complete search history.

(56) References Cited

U.S. PATENT DOCUMENTS 5,192,979 A * 3/1993 Grage et al. ................. 356/28.5
7,312,855 B1 * 12/2007 Hintz et al. .................. 356/4.01

OTHER PUBLICATIONS

"Laser Doppler vibrometer," Wikipedia, 4 pages, last modified on May 8, 2012.
Albota et al., "Three-dimensional imaging laser radar with a photon-counting avalanche photodiode array and microchip laser," Applied Optics, vol. 41, No. 36, Dec. 20, 2002, pp. 7671-7678.
Vernon R. Goodman, U.S. Appl. No. 13/554,567, filed Jul. 20, 2012, "Pseudo-Inverse Using Weiner-Levinson Deconvolution for GMAPD Ladar Noise Reduction and Focusing" (18 pages), and filing receipt mailed Aug. 7, 2012, (3 pages).
Vernon R. Goodman, U.S. Appl. No. 13/554,611, filed Jul. 20, 2012, "Noise Reduction and Focusing Algorithms for GMAPD" (16 pages), and filing receipt mailed Aug. 3, 2012, (3 pages).
Vernon R. Goodman, U.S. Appl. No. 13/554,589, filed Jul. 20, 2012, "Enhancing GMAPD Ladar Images Using 3-D Wallis Statistical Differencing" (20 pages), and filing receipt mailed Aug. 3, 2012, (3 pages).

* cited by examiner

*Primary Examiner* — Phuoc Tran (57) ABSTRACT

A method includes obtaining image data associated with a specified area having one or more objects. The method also includes segmenting the image data into one or more segments associated with the one or more objects. The method further includes analyzing each of the one or more segments to identify a vibrometry spectrum associated with the corresponding object. In addition, the method includes generating an image of the specified area using the vibrometry spectrum associated with each object. The image of the specified area could illustrate each of the one or more objects with an intensity based on a total power of that target's total vibrational energy. The image of the specified area could also illustrate movement of at least one object over time.

20 Claims, 7 Drawing Sheets

METHOD AND APPARATUS FOR IDENTIFYING A VIBROMETRY SPECTRUM IN IMAGING APPLICATIONS

TECHNICAL FIELD

This disclosure is generally directed to image processing systems. More specifically, this disclosure relates to a method and apparatus for identifying a vibrometry spectrum in imaging applications.

BACKGROUND

Laser vibrometry typically involves capturing non-contact vibration measurements of an object's surface. In a conventional laser vibrometer, a laser beam is reflected off a surface of interest, and the frequency and amplitude of the surface's vibrations can be identified based on the Doppler shift of the reflected laser beam. However, conventional laser vibrometers typically require the use of a coherent micro-Doppler source and sensor in order to capture fine frequency measurements. Unfortunately, various Laser Detection and Ranging (LADAR) systems and other systems are able to provide only ranging (distance) information to a target's surface and are unable to capture such fine frequency measurements.

SUMMARY

This disclosure provides a method and apparatus for identifying a vibrometry spectrum in imaging applications.

In a first embodiment, a method includes obtaining image data associated with a specified area having one or more objects. The method also includes segmenting the image data into one or more segments associated with the one or more objects. The method further includes analyzing each of the one or more segments to identify a vibrometry spectrum associated with the corresponding object. In addition, the method includes generating an image of the specified area using the vibrometry spectrum associated with each object.

In a second embodiment, an apparatus includes at least one memory configured to store image data associated with a specified area having one or more objects. The apparatus also includes at least one processing unit configured to segment the image data into one or more segments associated with the one or more objects, analyze each of the one or more segments to identify a vibrometry spectrum associated with the corresponding object, and generate an image of the specified area using the vibrometry spectrum associated with each object.

In a third embodiment, a non-transitory computer readable medium embodies a computer program. The computer program includes computer readable program code for obtaining image data associated with a specified area having one or more objects. The computer program also includes computer readable program code for segmenting the image data into one or more segments associated with the one or more objects. The computer program further includes computer readable program code for analyzing each of the one or more segments to identify a vibrometry spectrum associated with the corresponding object. In addition, the computer program includes computer readable program code for generating an image of the specified area using the vibrometry spectrum associated with each object.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 14B, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
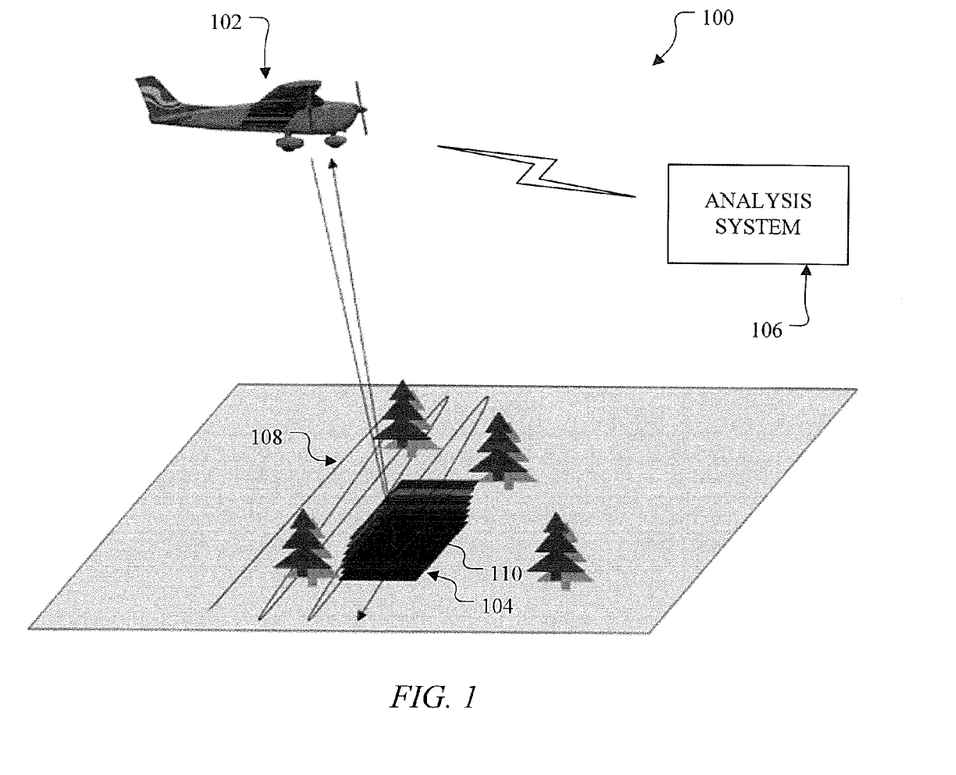
FIG. 1 illustrates an example LADAR system in accordance with this disclosure.

FIG. 1 illustrates an example LADAR system 100 in accordance with this disclosure. As shown in FIG. 1, a laser platform 102 includes at least one laser that directs radiation towards a given area 104 and at least one sensory array that receives reflections of that radiation from the given area 104. The platform 102 includes any suitable structure on which at least one laser and at least one sensory array can be placed. In this example, the platform 102 includes an airplane, although other platforms (such as a satellite, unmanned drone, or other vehicle) could be used.

The given area 104 represents any suitable area being scanned using the laser platform 102. The given area 104 could include zero or more targets or other objects, such as vehicles. Any objects in the given area 104 may be visible or obscured, such as when an object is located under trees or other foliage or is otherwise camouflaged. The given area 104 can have any suitable size, shape, and dimensions and can represent an area in any given environment.

The laser platform 102 directs radiation towards the given area 104 and receives radiation reflected from the given area 104. By performing calculations such as time-of-flight calculations, it is possible to obtain ranging information to any targets within the given area 104. The ranging information could then be analyzed to identify a vibrometry spectrum of each target. The vibrometry spectrum defines the vibrational characteristics of a target. The vibrometry spectrum of a target could be used in various ways, such as to automatically identify whether an engine in a target vehicle is running. The analysis can be done by a processing system on the platform 102 itself, or the analysis could be done remotely, such as by an analysis system 106. The analysis system 106 could receive measurement data or other data from the platform 102 in any suitable manner, such as via satellite or other wireless communications. The analysis system 106 includes any suitable computing or other data processing system that analyzes data and identifies vibrometry spectra for targets in the given area 104.

Figure 2:
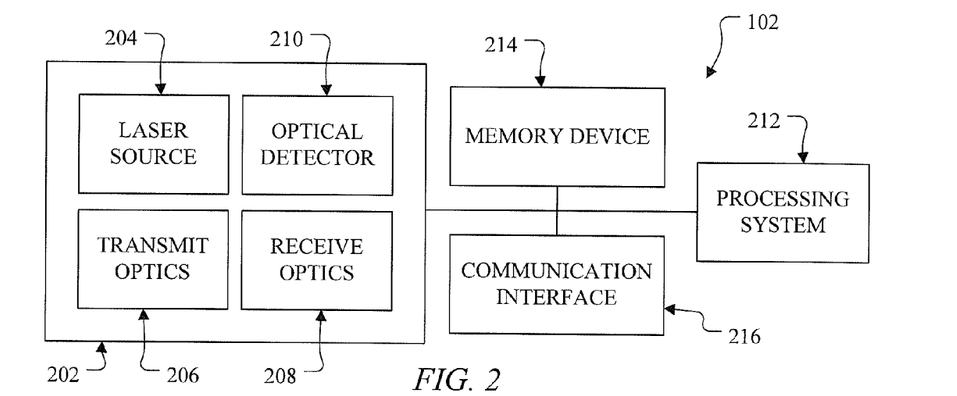
FIGS. 2 through 5 illustrate example components in the LADAR system of FIG. 1 in accordance with this disclosure.
Figure 3:
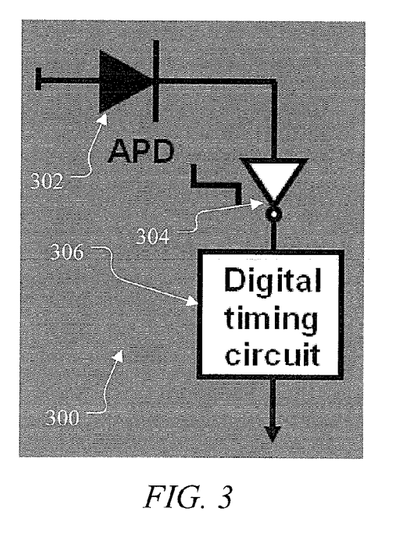
Figure 4:
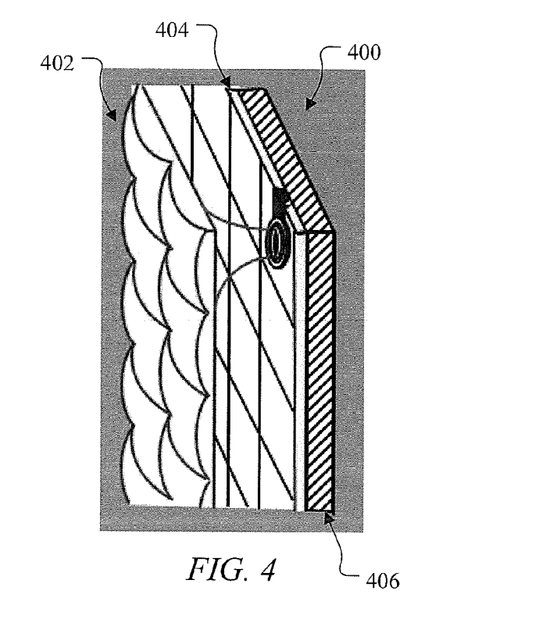
Figure 5:
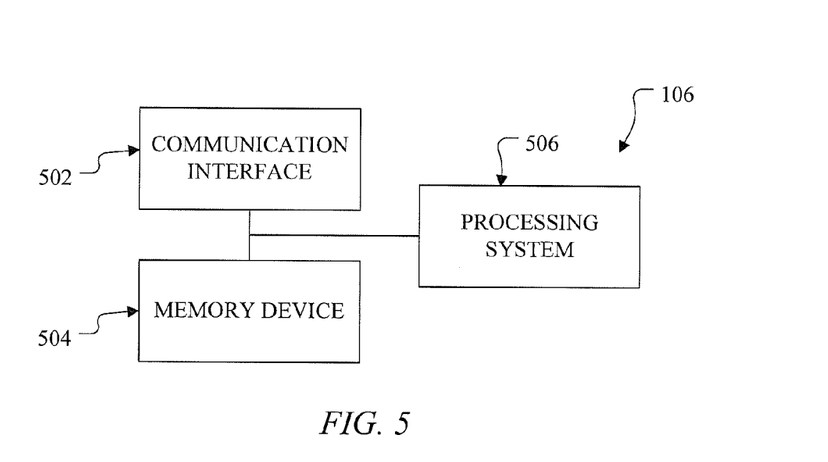

FIGS. 2 through 5 illustrate example components in the LADAR system 100 of FIG. 1 in accordance with this disclosure. In particular, FIGS. 2 through 4 illustrate an example laser platform 102 and its components, and FIG. 5 illustrates an example analysis system 106. These systems are simplified here for ease of explanation.

As shown in FIG. 2, the laser platform 102 includes a LADAR subsystem 202, which directs radiation towards the given area 104 and measures radiation reflected from the given area 104. In this example, the LADAR subsystem 202 includes a laser source 204 and transmit optics 206. The laser source 204 represents any suitable laser source generating illumination at a desired wavelength or in a desired wavelength range, such as a very narrow wavelength range. Depending on the implementation, the laser source 204 could generate radiation in the near infrared, visible, or ultraviolet spectrum. The transmit optics 206 include lenses, mirrors, or other suitable optical devices for directing radiation from the laser source 204 towards a target area, such as towards the given area 104 to be scanned.

The LADAR subsystem 202 also includes receive optics 208 and an optical detector 210. The receive optics 208 include lenses, mirrors, or other suitable optical devices for directing radiation reflected from the target area, such as from the given area 104, to the optical detector 210. The optical detector 210 measures the radiation received by the LADAR subsystem 202. The optical detector 210 includes any suitable structure for measuring radiation, such as an array of photodetectors.

In some embodiments, the subsystem 202 implements a Geiger-mode Avalanche Photodiode Detector (GmAPD) LADAR. In a conventional coherent or linear mode LADAR system, a laser source generates broad laser pulses and scans over a wide area (shown as the scan path 108 in FIG. 1). Also, a detector captures a single position on the ground per pulse and digitizes the returned pulse, possibly detecting multiple return pulses (such as from tree leaves and the ground). The waveform is thresholded to determine the time of the returns, and the range is calculated from the time of flight. This allows the system to determine where, for example, the tree leaves and ground are located.

In a GmAPD LADAR system, the laser source 204 generates narrow laser pulses, and a sensor array forming the detector 210 is over-biased so that the sensor array records the time of the first single photon detected for each pixel in the array. For every laser shot, the scan can capture a grid of points (shown in FIG. 1 as a 4×5 grid 110) per pulse. The same point can be illuminated multiple times. This allows multiple returns from the same ground post (the same position) using successive laser shots. For instance, the first shot may detect a photon reflected off tree leaves, while the next shot may detect a photon from a vehicle under the tree. This allows the possibility of foliage and camouflage net penetration.

Example components of a GmAPD LADAR system are shown in FIGS. 3 and 4. In FIG. 3, a single pixel 300 of the optical detector 210 in a GmAPD LADAR system is shown. The pixel 300 includes a photodiode 302 having an output coupled to an inverter 304, which is coupled to a digital timing circuit 306. The photodiode 302 is biased for Geiger-mode of operation, meaning the photodiode 302 is biased above its breakdown voltage. As a result, the photodiode 302 generates a charge avalanche upon generation of a single photoelectron. This means that the photodiode 302 triggers its output upon detecting a single photon from the given area 104, thereby yielding single-photon counting sensitivity. The inverter 304 inverts the output of the photodiode 302, and the digital timing circuit 306 generates a signal identifying the time-of-arrival of the photon. This results in the pixel 300 identifying the digital time of photon arrival with no amplifier noise.

Multiple pixels 300 can be combined to form a focal plane array 400 in the optical detector 210 as shown in FIG. 4. Any suitable number of pixels 300 could be used in the array 400, such as a 32×32 array up to a 32×128 array (although other arrangements could be used). As shown in FIG. 4, the focal plane array 400 includes a lens array 402, which includes multiple small lenses (often called "lenslets") that focus incoming light. The focal plane array 400 also includes an Avalanche Photodiode Detector (APD) array 404, which includes an array of the diodes 302 in the pixels 300. A complimentary metal-oxide semiconductor (CMOS) array 406 implements various other components of the pixels 300, such as the inverters 304 and digital timing circuits 306.

Returning to FIG. 2, the laser source 204 in a GmAPD LADAR system often illuminates the entire area of sensor coverage and has a lower power than that utilized by a coherent or linear mode LADAR system. Because of the lower power, the probability of detection is not necessarily 100%. Also, stray light and sensor internal thermal noise known as dark current (which can cause the circuit to avalanche because of over-biasing) contribute noise to the overall system, which can be filtered out using "coincidence processing" or other suitable processing technique. Additional details regarding an example GmAPD LADAR system are found in Albota et al., "Three-dimensional imaging laser radar with a photon-counting avalanche photodiode array and microchip laser," Applied Optics, Vol. 41, No. 36, 2002 (which is hereby incorporated by reference). Coincidence processing is a statistical method that determines if a single return point is noise or a true return by counting the number of points in fixed-sized voxels. Neighborhood coincidence processing also considers points in neighboring voxels.

Information about operation of the laser subsystem 202 (such as the timing of laser shots and the receipt of reflected photons) can be used in any suitable manner. For example, the information can be provided to at least one processing system 212, stored in at least one memory device 214, and/or communicated to at least one external device or system (such as the analysis system 106) via at least one communication interface 216. The processing system 212 could simply receive the information and pass it on to the external device or system via the communication interface 216, or the processing system 212 could analyze the information (such as to generate vibrometry spectra for targets). The processing system 212 could perform any other suitable operations as needed or desired, such as authentication or encryption operations.

The processing system 212 includes any suitable processing or computing device(s) configured to process information, such as at least one microprocessor, microcontroller, digital signal processor, field programmable gate array, application-specific integrated circuit, or other device(s). The memory device 214 includes any suitable storage and retrieval device(s), such as a volatile and/or non-volatile memory. The communication interface 216 includes any suitable interface(s) configured to transmit or receive data, such as at least one wireless transceiver.

As shown in FIG. 5, the analysis system 106 includes at least one communication interface 502, at least one memory device 504, and at least one processing system 506. Information from the laser platform 102 could be received via the communication interface 502, stored in the memory device 504, and analyzed by the processing system 506. The processing system 506 could analyze the information to generate vibrometry spectra for targets in the scanned area, store the vibrometry spectra in the memory device 504, communicate the vibrometry spectra to an external device or system, or use the vibrometry spectra (such as to generate a display of the scanned area).

The processing system 506 includes any suitable processing or computing device(s) configured to process information, such as at least one microprocessor, microcontroller, digital signal processor, field programmable gate array, application-specific integrated circuit, or other device(s). The memory device 504 includes any suitable storage and retrieval device(s), such as a volatile and/or non-volatile memory. The communication interface 502 includes any suitable interface(s) configured to transmit or receive data, such as at least one wireless transceiver.

Although FIGS. 1 through 5 illustrate one example of a LADAR system 100 and examples of components in the LADAR system 100, various changes may be made to FIGS. 1 through 5. For example, as noted above, the laser platform 102 could include any other suitable platform vehicle. Also, information collected by the laser platform 102 could be analyzed by the processing system 212 on the platform 102, the processing system 506 in the analysis system 106, or any other suitable device or system. If processed on the platform 102, the resulting vibrometry spectra could be used locally (such as to generate displays for an operator on the platform 102) or communicated to an external device or system (with or without the underlying data). Similarly, if processed on the analysis system 106, the resulting vibrometry spectra could be used locally (such as to generate displays for an operator in an analysis center) or communicated to an external device or system (with or without the underlying data). In addition, these figures represent one example environment where vibrometry spectra can be determined using an imaging system. This functionality could be used with any other suitable imaging system.

Figure 6:
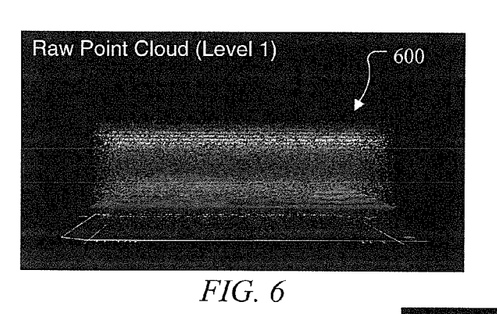
FIGS. 6 and 7 illustrate example types of point cloud data used by the LADAR system of FIG. 1 in accordance with this disclosure.
Figure 7:
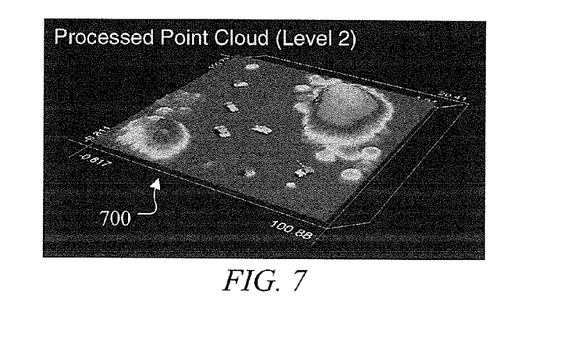

FIGS. 6 and 7 illustrate example types of point cloud data used by the LADAR system of FIG. 1 in accordance with this disclosure. When describing the generation of vibrometry spectra below, various types of data can be used. In some embodiments (such as GmAPD systems), there are three "levels" of data that contain information about a scene. "Level 0" data refers to raw data associated with the laser platform 102 and laser pulses directed to and reflected from the given area 104. Examples of Level 0 data can include platform position, platform Euler angles (roll, pitch, and yaw), azimuth and elevation pointing angles of a sensor, and round trip time of laser light. "Level 1" data represents computed X/Y/Z positions, frame numbers, and pixel numbers of laser returns, including both real returns and noise. An example of Level 1 data is shown in FIG. 6. As can be seen in FIG. 6, a raw point cloud 600 (Level 1 data) does not provide much useful information to an operator. "Level 2" data represents smoothed and de-noised point cloud data. An example of Level 2 data is shown in FIG. 7. As can be seen in FIG. 7, a processed point cloud 700 (Level 2 data) provides much more useful information to an operator, such as topographical information or objects of interest.

As noted above, conventional laser vibrometers often require the use of coherent micro-Doppler sources and sensors in order to capture fine frequency measurements. However, some ranging systems (such as GmAPD or other LADAR systems) provide only ranging information to a target's surface and cannot capture such fine frequency measurements. Described below are various techniques for obtaining vibrometry spectra for targets in a given area 104 using data from systems like GmAPD or photon-counting LADAR systems. The vibrometry spectra can be used in various ways, such as to determine whether targets such as vehicles, industrial equipment, HVAC (heating, ventilation, air conditioning) systems, and generators are vibrating and therefore operating. Additionally, successive spectra and instantaneous height changes of a vehicle as it moves down a road can be compared with an expected response based on the road's contours to determine whether that vehicle is loaded or empty. This supports the ability to gather phenomenological information from existing and future sensors that are based on range-only measurement.

Figure 8:
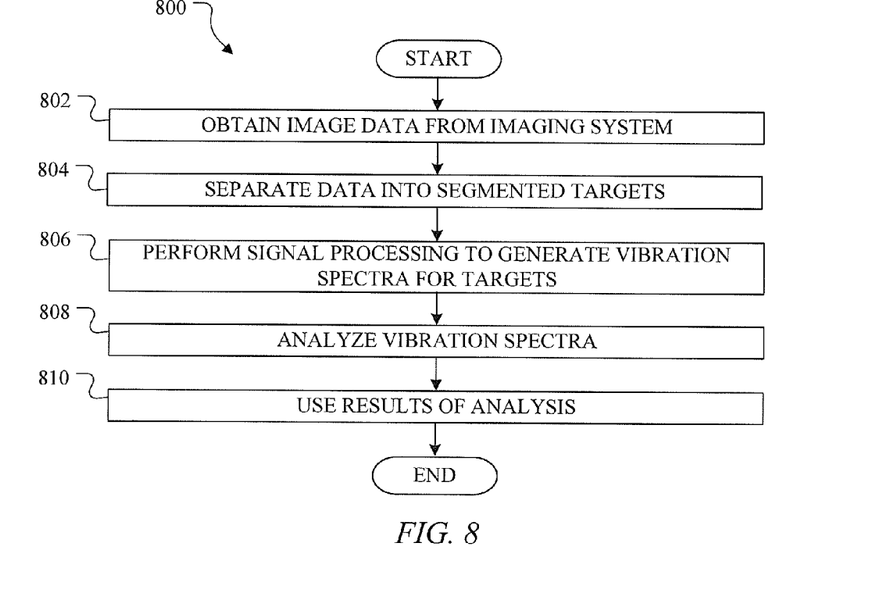
FIG. 8 illustrates an example method for identifying and using a vibrometry spectrum in accordance with this disclosure.

FIG. 8 illustrates an example method 800 for identifying and using a vibrometry spectrum in accordance with this disclosure. For ease of explanation, the method 800 is described as being performed by the processing system 212 in the platform 102 or the processing system 506 in the analysis system 106. The method 800 could be performed by any other or additional processing systems in one or more locations.

Image data is obtained from an imaging system at step 802. This could include, for example, the processing system 212 or 506 receiving measurement data obtained by the optical detector 210. The measurements could represent measurements associated with the first photons received by each pixel of the optical detector 210 in a GmAPD system. Other data could also be obtained, such as an identification of the time-of-flight for a laser pulse from the laser source 204 to a target and back. The data may involve one or more targets that could be traveling or otherwise operating (and therefore vibrating).

The data is separated into segmented targets at step 804. This could include, for example, the processing system 212 or 506 dividing the image data into different segments, where each segment is associated with a different potential target or other object. In some embodiments, the processing system 212 or 506 could perform volumetric change detection, automated data segmentation, or target tracking. In general, any suitable technique could be used to identify a potential target of interest. In particular embodiments, the segmentation is done using Level 2 data, and each segment represents a collection of Level 2 data associated with a potential target.

Signal processing is performed to generate a vibration spectrum for each target at step 806, and the vibration spectra are analyzed at step 808. In some embodiments, the signal processing could vary depending on the mode of operation for the processing system 212 or 506. For example, the processing system 212 or 506 could operate in a map mode or a target mode. In map mode, the system 100 scans a given area 104 over a shorter period of time and attempts to identify targets in the area that are vibrating. In target mode, the system 100 scans the given area 104 over a longer length of time and identifies movement of an object as well as the object's vibrational characteristics.

The results of the analysis are used at step 810. This could include, for example, the processing system 212 or 506 generating a map that graphically illustrates the given area 104 and that identifies any targets currently vibrating. The intensity of each target in the map could depend on the level of that target's vibrations. This could also include the processing system 212 or 506 generating a map that graphically illustrates the given area 104 and shows movement of a target over time. The results of the analysis could be used in any other suitable manner.

Figure 9:
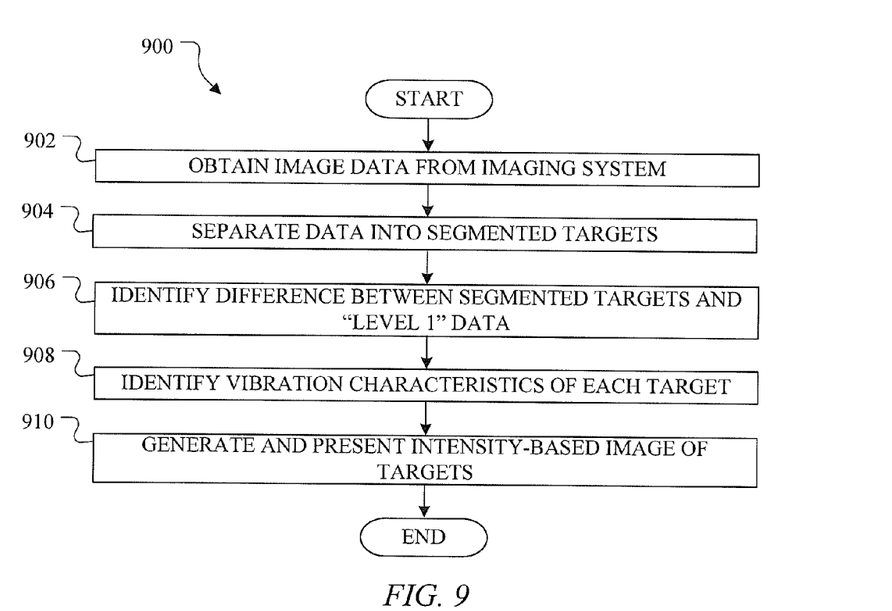
FIGS. 9 through 11 illustrate a more specific example method and related details for identifying and using a vibrometry spectrum in a first (single scan) mode of operation in accordance with this disclosure.
Figure 10:
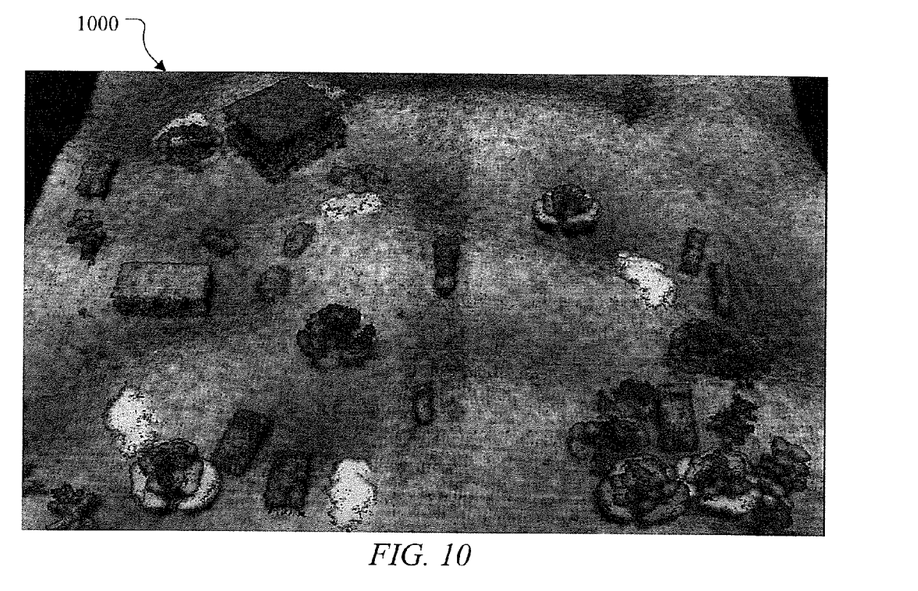
Figure 11:
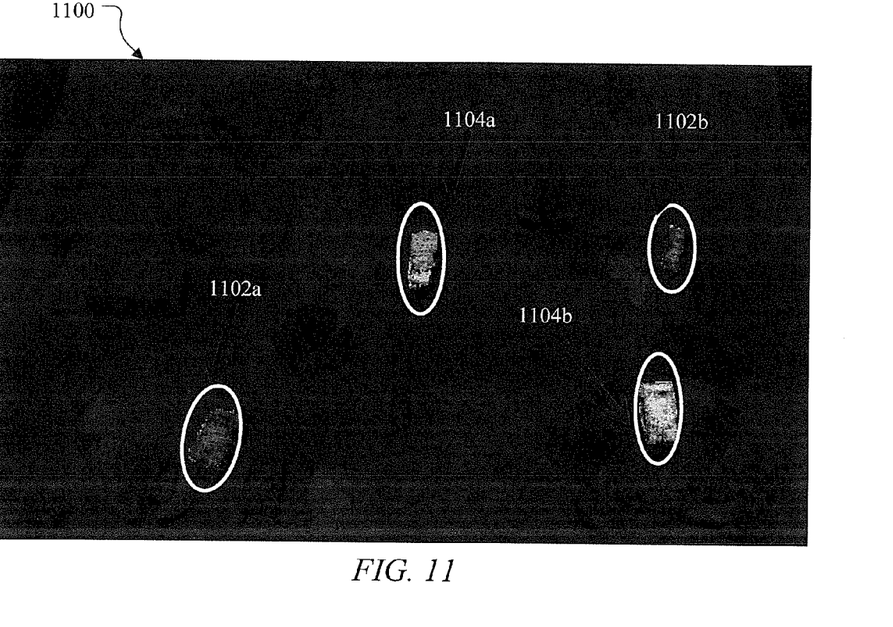

FIGS. 9 through 11 illustrate a more specific example method and related details for identifying and using a vibrometry spectrum in a first (single scan) mode of operation in accordance with this disclosure. In particular, FIGS. 9 through 11 illustrate a method 900 and related details for identifying and using a vibrometry spectrum in a map mode of operation. In this mode, the system 100 scans a given area 104 over a shorter period of time, generating data in one or a limited number of frames.

Image data is obtained from an imaging system at step 902. This could include, for example, the processing system 212 or 506 receiving measurement data obtained by the optical detector 210. The data is separated into segmented targets at step 904. This could include, for example, the processing system 212 or 506 performing any suitable technique to identify potential targets of interest and segmenting the image data based on the identified targets. Each segment can represent part of a collection of Level 2 data.

Differences between each segmented target and their corresponding Level 1 data are identified at step 906. This could include, for example, the processing system 212 or 506 identifying the difference between each point in a Level 2 point cloud's segment and the corresponding point in a Level 1 point cloud. The vibration characteristics of each target are identified at step 908. This could include, for example, the processing system 212 or 506 using Parseval's Theorem, which defines the conservation of power between frequency and time domains. In this case, the differences between each segmented target and the corresponding Level 1 data are in the time domain, and step 908 involves converting that information into the frequency domain.

An intensity-based image of the targets is generated and presented (or used in other ways) at step 910. This could include, for example, the processing system 212 or 506 generating a three-dimensional image of the given area 104 and any targets in the given area 104. This could also include the processing system 212 or 506 illuminating different targets in the image with different intensities based on different vibration levels of the targets. In particular embodiments, the intensities of the targets can be determined as follows. The "vibrational energy" of each target can be calculated by summing the squares of the amplitudes of the target's spectral or time-domain vibration waveform and dividing the value by the length of the waveform. The resulting value represents the total power of the target's total vibrational energy. The intensity of each target can be based on the total power of that target's total vibrational energy.

An example of this is shown in FIGS. 10 and 11. In FIG. 10, an image 1000 represents a three-dimensional image of a given area 104 and any topographical features and targets in the given area 104. In FIG. 11, an image 1100 also represents a three-dimensional image of the given area 104 and any topographical features and targets in the given area 104. However, the image 1100 has a lower intensity overall compared to the image 1000. Also, two targets 1102a-1102b in the image 1100 are shown as having lower intensities, while two targets 1104a-1104b in the image 1100 are shown as having higher intensities. Here, the system 100 has determined that the targets 1104a-1104b are vibrating more than the targets 1102a-1102b. In this way, the image 1100 is able to quickly convey to an operator which targets in a given area 104 are currently operating or otherwise vibrating. The system 100 could generate one or both images 1000 and 1100. As a particular example, the system 100 could present the image 1000 to the operator and then, in response to input from the operator, generate the image 1100. However, the system 100 could also generate the image 1100 without first generating the image 1000.

Figure 12:
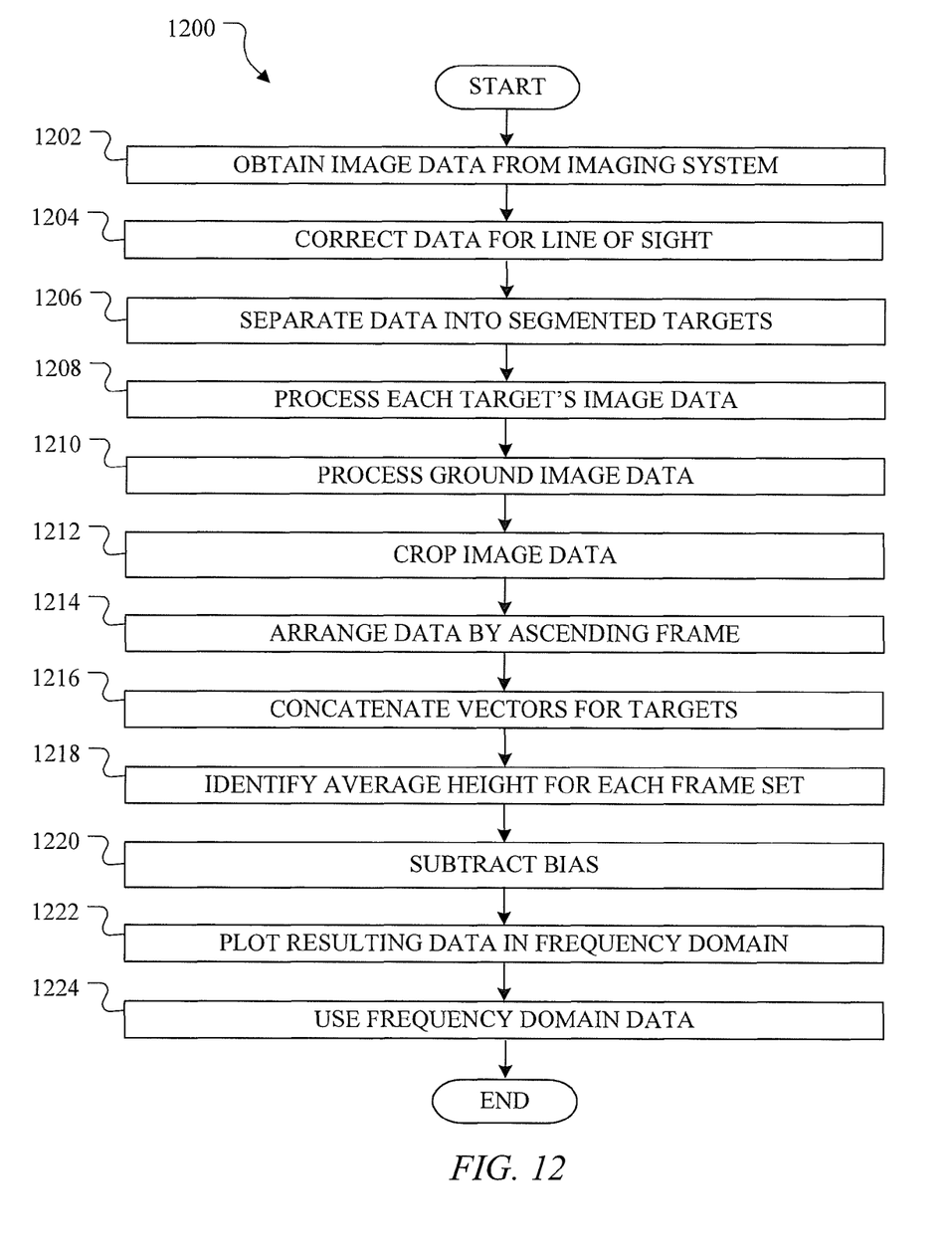
FIGS. 12 and 13 illustrate a more specific example method and related details for identifying and using a vibrometry spectrum in a second (multiple scan) mode of operation in accordance with this disclosure.
Figure 13:
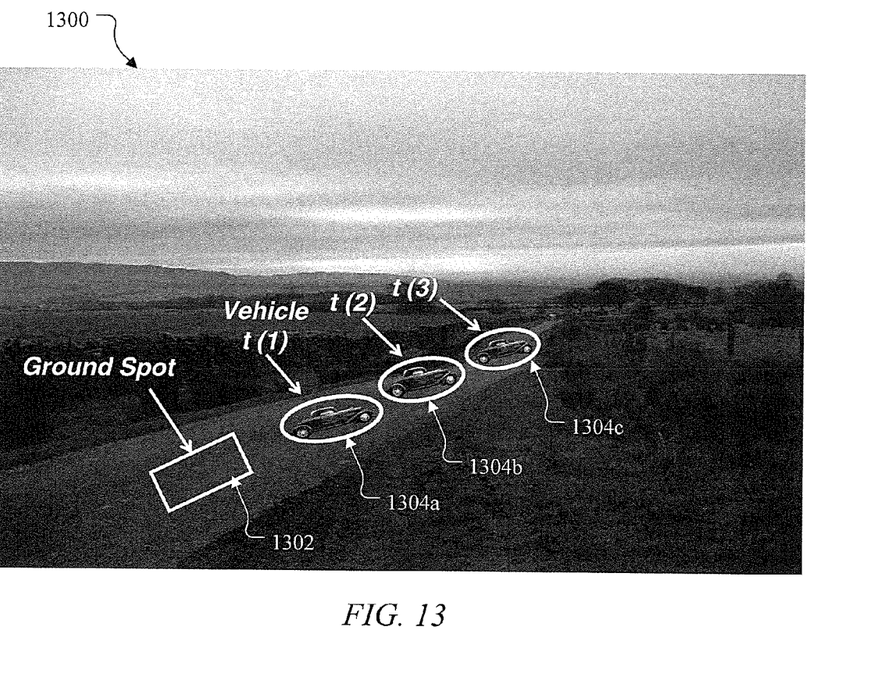

FIGS. 12 and 13 illustrate a more specific example method and related details for identifying and using a vibrometry spectrum in a second (multiple scan) mode of operation in accordance with this disclosure. More specifically, FIGS. 12 and 13 illustrate a method 1200 and related details for identifying and using a vibrometry spectrum in a target mode of operation. In this mode, the system 100 scans the given area 104 over a longer period of time, generating data in a larger number of frames.

Image data is obtained from an imaging system at step 1202. This could include, for example, the processing system 212 or 506 receiving measurement data obtained by the optical detector 210. The image data is corrected for any line-of-sight issues at step 1204. This could include, for example, the processing system 212 or 506 modifying Level 1 point cloud data based on the location of the platform 102 with respect to the given area 104. The data is separated into segmented targets at step 1206. This could include, for example, the processing system 212 or 506 performing any suitable technique to identify potential targets of interest and segmenting the image data based on the identified targets. Each segment can represent part of a collection of Level 2 data.

The system processes each target's image data at step 1208 and processes ground data at step 1210. For each target, this could include the processing system 212 or 506 identifying the difference between each point in a Level 2 point cloud's segment and the corresponding point in a Level 1 point cloud. This could also include the processing system 212 or 506 subtracting a ground spot's data from each target's segment. For the ground, this could include the processing system 212 or 506 identifying the differences between the Level 2 cloud points and the corresponding Level 1 cloud points for the ground spot.

The image data is cropped at step 1212. This could include, for example, the processing system 212 or 506 performing a histogram-guided cropping that filters data furthest from peak values in each target's image data using standard deviation. Image data is arranged by ascending frame at step 1214, and vectors for any targets are concatenated at step 1216. This could include, for example, the processing system 212 or 506 arranging X/Y/Z and pixel data by ascending frame and concatenating vectors for any moving vehicles or other targets. An average height of each target is identified using the frames at step 1218, and any DC or other bias is subtracted from the identified heights at step 1220.

Figure 14A:
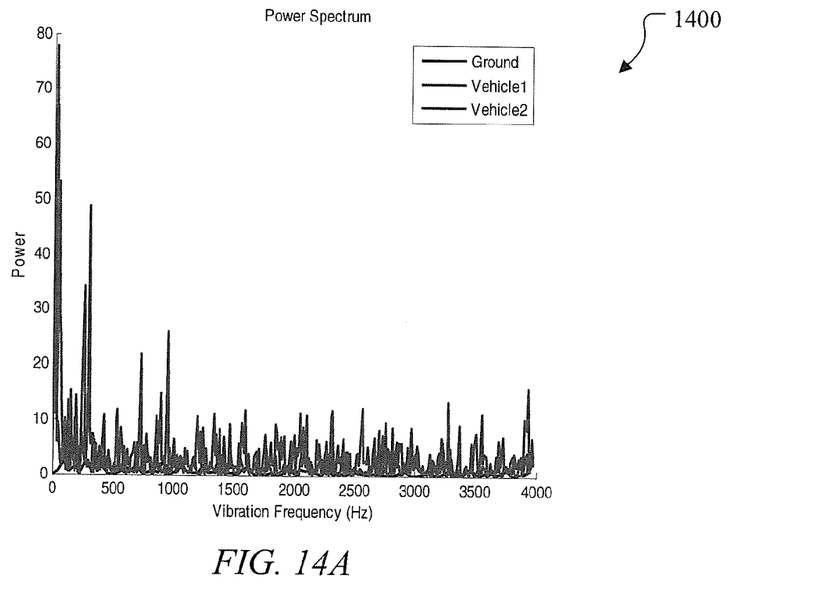
FIGS. 14A and 14B illustrate example vibrometry spectra in accordance with this disclosure.
Figure 14B:
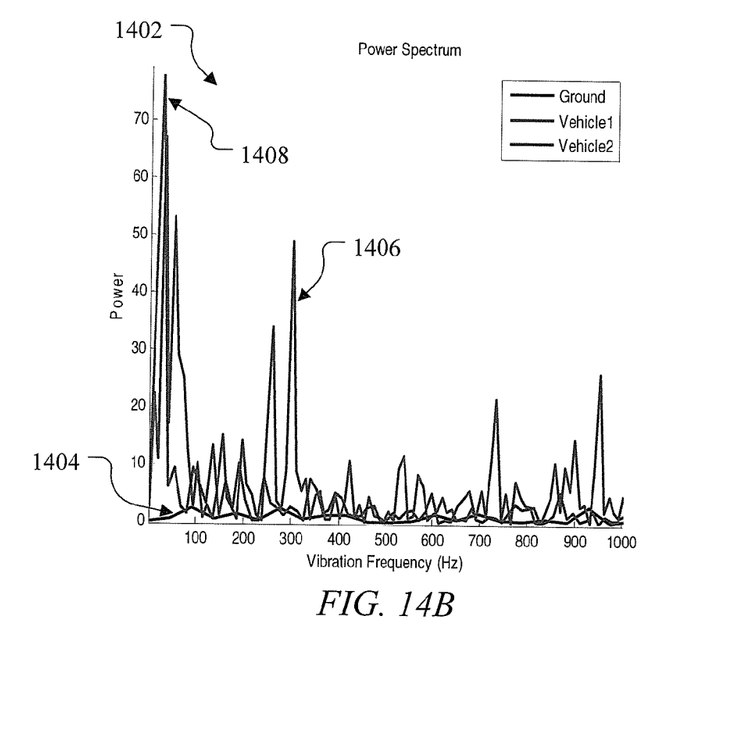

The resulting data is plotted in the frequency domain at step 1222. This could include, for example, the processing system 212 or 506 generating an FFT power spectrum. The frequency domain data can then be used in any suitable manner at step 1224. This could include, for example, the processing system 212 or 506 generating an image that shows movement of a target object over time. An example of this is shown in FIG. 13, where an image 1300 shows a ground spot 1302 and multiple instances 1304a-1304c of a target moving. The ground spot 1302 represents an area lacking any targets, and the frequency domain data represents the vibrometry spectrum for the object, FIG. 14A and 14B illustrate example vibrometry spectra in accordance with this disclosure. In particular, FIG. 14A illustrates the vibrometry spectra 1400 of two operating vehicles and the ground over a 4 kHz range, while FIG. 14B illustrates a portion 1402 of that vibrometry spectra over a narrower 1 kHz range. Here, line 1404 represents the vibrometry spectrum of the ground, line 1406 represents the vibrometry spectrum of a first vehicle, and line 1408 represents the vibrometry spectrum of a second vehicle. As shown in FIGS. 14A and 14B, the vibrometry spectra 1400 show that there is spectral content evident for the operating vehicles that is absent for the ground. These vibrometry spectra 1400 therefore clearly show that vibrational characteristics of a target can be determined using the frequency domain data captured using a GmAPD or other ranging system.

Although FIGS. 6 through 14B illustrate example details of identifying and using a vibrometry spectrum, various changes may be made to FIGS. 6 through 14B. For example, the point cloud data shown in FIGS. 6 and 7 and the images shown in FIGS. 10, 11, and 13 are for illustration only. Also, while FIGS. 8, 9, and 12 show example methods having serial steps, various steps in each figure could overlap, occur in parallel, occur in a different order, or occur multiple times. In addition, the example spectra shown in FIGS. 14A and 14B are for illustration only.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The term "obtain" and its derivatives refer to any acquisition of data or other tangible or intangible item, whether acquired from an external source or internally (such as through internal generation of the item). The terms "include" and "comprise," as well as derivatives thereof, mean inclusion without limitation. The term "obtain" and its derivatives refer to any acquisition of data or other tangible or intangible item, whether acquired from an external source or internally (such as through internal generation of the item). The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining image data associated with a specified area having one or more objects;
    segmenting the image data into one or more segments associated with the one or more objects;
    analyzing each of the one or more segments to identify a vibrometry spectrum associated with the corresponding object; and
    generating an image of the specified area using the vibrometry spectrum associated with each object.

2. The method of claim 1, wherein the image of the specified area illustrates each of the one or more objects with an intensity based on a total power of that target's total vibrational energy, the total vibrational energy based on that object's vibrometry spectrum and calculated using Parseval's Theorem.

3. The method of claim 1, wherein the image of the specified area illustrates each of the one or more objects with an intensity based on a total power of that target's total vibrational energy, the total vibrational energy based on that object's time-domain information and calculated using Parseval's Theorem.

4. The method of claim 2, wherein analyzing each of the one or more segments comprises identifying a difference between first point cloud data and a segment of second point cloud data associated with each object, the first point cloud data comprising calculated positions and noise, the second point cloud data comprising smoothed and de-noised data.

5. The method of claim 4, wherein analyzing each of the one or more segments comprises identifying each vibrometry spectrum by converting time-domain information into frequency-domain information.

6. The method of claim 1, wherein the image of the specified area illustrates movement of at least one object over time.

7. The method of claim 6, wherein analyzing each of the one or more segments comprises subtracting first point cloud data and ground spot data from a segment of second point cloud data associated with each object, the first point cloud data comprising calculated positions and noise, the second point cloud data comprising smoothed and de-noised data, the ground spot data comprising data associated with a portion of the specified area not occupied by a target.

8. An apparatus comprising:
    at least one memory configured to store image data associated with a specified area having one or more objects; and
    at least one processing unit configured to:
        segment the image data into one or more segments associated with the one or more objects;
        analyze each of the one or more segments to identify a vibrometry spectrum associated with the corresponding object; and
        generate an image of the specified area using the vibrometry spectrum associated with each object.

9. The apparatus of claim 8, wherein the image of the specified area illustrates each of the one or more objects with an intensity that is based on a total power of that target's total vibrational energy, the total vibrational energy based on that object's vibrometry spectrum and calculated using Parseval's Theorem.

10. The apparatus of claim 8, wherein the image of the specified area illustrates each of the one or more objects with an intensity that is based on a total power of that target's total vibrational energy, the total vibrational energy based on that object's time-domain information and calculated using Parseval's Theorem.

11. The apparatus of claim 9, wherein the at least one processing unit is configured to identify a difference between first point cloud data and a segment of second point cloud data associated with each object, the first point cloud data comprising calculated positions and noise, the second point cloud data comprising smoothed and de-noised data.

12. The apparatus of claim 11, wherein the at least one processing unit is configured to identify each vibrometry spectrum by converting time-domain information into frequency-domain information.

13. The apparatus of claim 8, wherein the image of the specified area illustrates movement of at least one object over time.

14. The apparatus of claim 13, wherein the at least one processing unit is configured to subtract first point cloud data and ground spot data from a segment of second point cloud data associated with each object, the first point cloud data comprising calculated positions and noise, the second point cloud data comprising smoothed and de-noised data, the ground spot data comprising data associated with a portion of the specified area not occupied by a target.

15. A non-transitory computer readable medium embodying a computer program, the computer program comprising computer readable program code for:
 obtaining image data associated with a specified area having one or more objects;
 segmenting the image data into one or more segments associated with the one or more objects;
 analyzing each of the one or more segments to identify a vibrometry spectrum associated with the corresponding object; and
 generating an image of the specified area using the vibrometry spectrum associated with each object.

16. The computer readable medium of claim 15, wherein the image of the specified area illustrates each of the one or more objects with an intensity based on a total power of that target's total vibrational energy, the total vibrational energy based on that object's vibrometry spectrum and calculated using Parseval's Theorem.

17. The computer readable medium of claim 15, wherein the intensity of each object in the image is based on a total power of that target's total vibrational energy, the total vibrational energy based on that object's time-domain information and calculated using Parseval's Theorem.

18. The computer readable medium of claim 16, wherein the computer readable program code for analyzing each of the one or more segments comprises computer readable program code for identifying a difference between first point cloud data and a segment of second point cloud data associated with each object, the first point cloud data comprising calculated positions and noise, the second point cloud data comprising smoothed and de-noised data.

19. The computer readable medium of claim 15, wherein the image of the specified area illustrates movement of at least one object over time.

20. The computer readable medium of claim 19, wherein the computer readable program code for analyzing each of the one or more segments comprises computer readable program code for subtracting first point cloud data and ground spot data from a segment of second point cloud data associated with each object, the first point cloud data comprising calculated positions and noise, the second point cloud data comprising smoothed and de-noised data, the ground spot data comprising data associated with a portion of the specified area not occupied by a target.

* * * * *